(12) United States Patent
Bromham et al.

(10) Patent No.: US 6,985,696 B2
(45) Date of Patent: Jan. 10, 2006

(54) METHOD AND APPARATUS FOR FACILITATING WIRELESS COMMUNICATIONS WITH A NONAUTOMOTIVE ROAMING OBJECT

(75) Inventors: Richard Bromham, Chicago, IL (US); Walter L. Davis, Arlington, WA (US); Robert M. Gardner, Gilbert, AZ (US); Shrirang Jambhekar, Paletine, IL (US); Maria Thompson, Hoffman Estates, IL (US)

(73) Assignee: Motorola, Inc., Schaumburg, IL (US)

( * ) Notice: Subject to any disclaimer, the term of this patent is extended or adjusted under 35 U.S.C. 154(b) by 622 days.

(21) Appl. No.: 10/027,223

(22) Filed: Dec. 20, 2001

(65) Prior Publication Data

US 2003/0119445 A1 Jun. 26, 2003

(51) Int. Cl.
*H04B 5/00* (2006.01)
(52) U.S. Cl. .................... 455/41.2; 455/39; 455/456.2; 455/41.3
(58) Field of Classification Search .............. 455/186.2, 455/566, 412.2, 414.1, 414.2, 414.3, 421, 455/422.1, 432.1, 432.3, 452.1, 456.1, 456.2, 455/456.3, 456.5, 457, 434, 515, 517, 456.6, 455/458, 92, 95, 100, 39, 41.1, 41.2, 41.3; 345/169, 171, 168, 773, 947, 948; 341/22, 341/23, 28; 715/535, 531, 530; 704/8, 9, 704/3, 5, 1; 434/118; 400/489, 109, 323.3, 400/110, 111
See application file for complete search history.

(56) References Cited

U.S. PATENT DOCUMENTS

| | | | |
|---|---|---|---|
| 4,907,290 A | 3/1990 | Crompton | |
| 5,187,810 A * | 2/1993 | Yoneyama et al. | 455/509 |
| 5,767,788 A | 6/1998 | Ness | |
| 5,835,053 A | 11/1998 | Davis | |
| 5,848,129 A | 12/1998 | Baker | |
| 6,091,956 A * | 7/2000 | Hollenberg | 455/456.5 |
| 6,219,409 B1 | 4/2001 | Smith et al. | |
| 6,429,789 B1 | 8/2002 | Kiridena et al. | |
| 6,430,486 B1 | 8/2002 | Diaz et al. | |
| 6,472,978 B1 * | 10/2002 | Takagi et al. | 340/435 |
| 2002/0014976 A1 * | 2/2002 | Yoshida | 340/928 |

OTHER PUBLICATIONS

S. Ashley, "Driving The Info Highway," www.sciam.com, Scientific American, Oct., 2001, pp. 52-58.

* cited by examiner

*Primary Examiner*—Tilahun Gesesse
*Assistant Examiner*—John J. Lee

(57) ABSTRACT

A radio (10) communicates compatibly with a dedicated short range roadside information service and is adapted and configured to be worn by a pedestrian or otherwise mounted on or installed in a variety of nonautomotive roaming objects. Various modes of operation are supported including a beacon mode (50), a remote transmitter mode (60), a remote disable mode (70), and a location based operating mode (80).

16 Claims, 3 Drawing Sheets

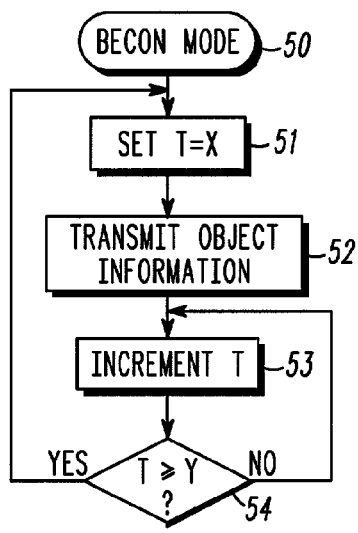
*FIG. 5*
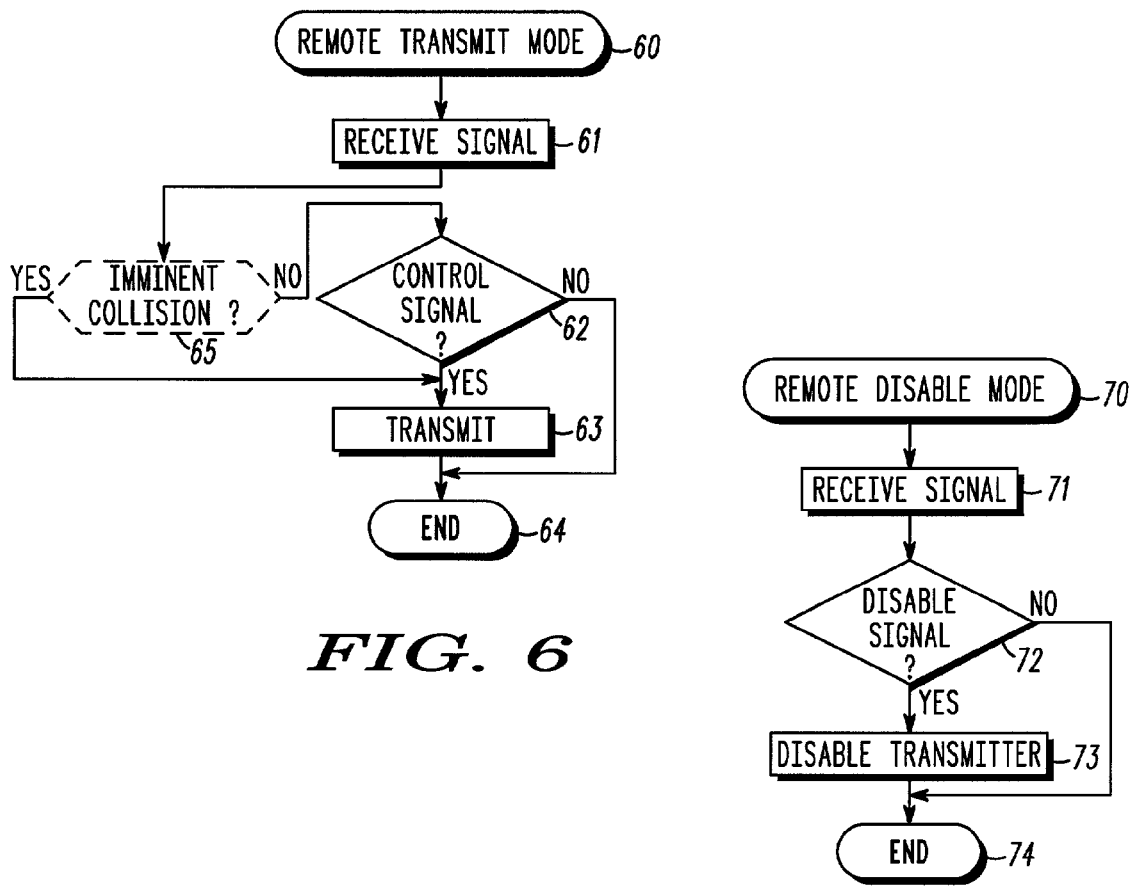
*FIG. 6*
*FIG. 7*

METHOD AND APPARATUS FOR FACILITATING WIRELESS COMMUNICATIONS WITH A NONAUTOMOTIVE ROAMING OBJECT

TECHNICAL FIELD

This invention relates generally to wireless communications and more particularly to wireless communications that are compatible with a dedicated short range radio frequency-based roadside information service.

BACKGROUND

Wireless communications are known. Wireless systems making use of frequency reuse, such as cellular systems, are virtually ubiquitous and dispatch services are also well integrated and dispersed. Both are key components of modern infrastructure.

Now, at least one group seeks to define a new wireless communications service to specifically facilitate terrestrial-based vehicular journeys (particularly for automobiles and trucks). Presently known as dedicated short range communications (DSRC), the Federal Communications Commission in the United States has presently at least tentatively identified spectrum that can be used for such journey-related information. The American Society for Testing and Materials presently acts as a standards development group to define such a communications service to support provision of journey-related information to vehicular users. At present, the over-the-air interface has not been defined (though at least two wireless local area network systems—the I.E.E.E. #802.11A and Motorola's control channel based Freespace system—have been proposed and are being considered). This group has, however, made considerable progress towards defining the services that the service will support. In particular, such a journey-related information provision system should ultimately provide roadside information and corresponding vehicle-to-vehicle communications to support both public safety and private requirements (depending upon the application transmission range will likely vary from fifteen meters to three hundred meters).

As an example of public safety services, such a roadside information system can be expected to support:

Traffic count (for example, determining the number of vehicles that traverse an intersection over a given period of time);
Traffic movement information;
Toll collection;
In-vehicle signage (for example, presenting "stop" information within the cockpit of a vehicle as the vehicle approaches a stop sign);
Road condition warnings;
Intersection collision avoidance (including highway/rail intersections);
Vehicle-to-vehicle information (for example, stopped vehicle or slowing vehicle information);
Rollover warnings;
Low bridge warnings;
Border clearance facilitation;
On-board safety data transfer;
Driver's daily log;
Vehicle safety inspection information; and
Emergency vehicle traffic signal preemption.

Examples of private requirements include;
Premises access control;
Gasoline payment;
Drive-through retail payment;
Parking lot payments;
Various vehicular related data transfers (for example, diagnostic data, repair service record data, vehicular computer program updates, map information, and user content such as music);
Rental car processing;
Fleet management;
Locomotive fuel monitoring; and
Locomotive data transfer.

These capabilities and services hold promise for safer, more convenient, and even more pleasurable terrestrial based journeys. Notwithstanding such promise, however, certain needs and opportunities remain unmet and unaddressed by either such systems as proposed above or as are otherwise available in the prior art. For example, no consideration has been given to utilizing such infrastructure to aid in assisting vehicles to avoid collisions with nonautomotive roaming objects such as pedestrians, bicyclists, domestic animals and the like. While active sensors such as automotive radar and night vision systems have been proposed to assist in this regard, no suggestion has been made that a dedicated short range radio frequency-based roadside information service infrastructure could be leveraged towards such ends. Similarly, no consideration has been given to other benefits that might accrue to a pedestrian or other nonautomotive roaming object through favorable interaction with such a service.

A need therefore exists for a way to benefit both the safety and convenience of pedestrians and other nonautomotive roaming objects through some appropriate interaction with a dedicated short range radio frequency-based roadside information service. Solutions should preferably not require a significant expansion of the standard infrastructure for such a system.

BRIEF DESCRIPTION OF THE DRAWINGS

These needs and others are substantially met through provision of the method and apparatus for facilitating wireless communications with a nonautomotive roaming object described below. Various benefits will become more clear upon making a thorough review and study of the following detailed description, particularly when considered in conjunction with the drawings, wherein:

FIG. 5 comprises a flow diagram configured in accordance with various embodiments of the invention;

FIG. 6 comprises a flow diagram configured in accordance with various embodiments of the invention;

FIG. 7 comprises a flow diagram configured in accordance with various embodiments of the invention;

DETAILED DESCRIPTION

Pursuant to the embodiments described below, a radio that is compatible with a dedicated short range radio frequency-based roadside information service is adapted and configured to be disposed on nonautomotive roaming objects (such objects can be pedestrians of all types, persons in wheelchairs, bicyclists, persons on skateboards, rollerblades, and scooters, as well as domestic animals and certain wild animals, and various non-living but at least occasionally moving objects including toys and the like). Depending upon the intended application, this radio can be a transmit only platform, a receive only platform, or a transceiver platform. In each case, the radio functions compatibly with the dedicated short range radio frequency-based roadside information service which service ordinarily functions to facilitate provision of various kinds of roadside information to vehicles and also certain vehicle-to-vehicle communications. With these basic platforms, various features and functionality can promote increased safety (in particular though not exclusively through object-to-vehicle communications) and increased convenience (in particular though not exclusively through roadside information service-to-object communications).

Figure 1:
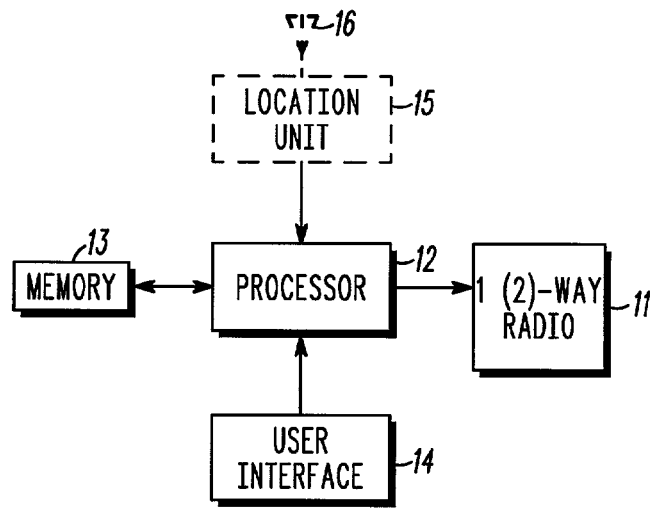
FIG. 1 comprises a block diagram depiction of a radio configured in accordance with various embodiments of the invention.

Referring now to FIG. 1, the radio 10 includes a one-way or two-way radio 11. When only transmission or reception capabilities are required, a transmit-only or receive-only radio 11 will suffice. When both transmission and reception capabilities are required, then a two-way transceiver should be utilized. As noted above, this radio 11 is compatible with a dedicated short range radio frequency-based roadside information service. If desired, the radio 11 can also be made compatible with more than one such roadside information service, and/or other communications services. This radio 11 should at least constitute a short range platform in keeping with the roadside information service operating parameters. In addition, if desired, the radio 11 can also include an optional high power transmission capability (the benefits of which will be described below in more detail).

The radio couples to and is at least partially controlled by a processor 12. This processor 12 can be a microprocessor or any other computational platform as will suffice to support the various capabilities described below. The processor 12 couples to a memory 13 that can store both operational software and other information regarding the nonautomotive roaming object with which the radio 10 will be used as described in more detail below. The processor 12 also couples to a user interface 14 and optionally to a location unit 15. The user interface 14 can comprise an input mechanism (such as a text entry device such as a keyboard or touchpad and/or a cursor movement device and/or one or more buttons, switches, or the like) and/or an output mechanism (such as a visual display, an audio transducer, and/or a tactile sensory transducer). The location unit 15, when provided, comprises a unit that can determine either an absolute position of the radio 10 (and hence a nonautomotive roaming object to which the radio 10 is attached) or a relative position of the radio 10 with respect to one or more other objects (such as other similar devices and/or nearby vehicles). The location unit 15 could be, for example, a global positioning system receiver (as exemplified by the optional antenna 16) or other location determining mechanism (such as a dead reckoning based system). (Location information can also be potentially gleaned in other ways that do not require such a location unit 15. For example, roadside transmitters that comprise a part of the dedicated short range radio frequency-based roadside information system may transmit information regarding their own position along with their information payload, and receipt of such information by the radio 10 can be utilized to derive at least an approximate sense of location.)

Figure 2:
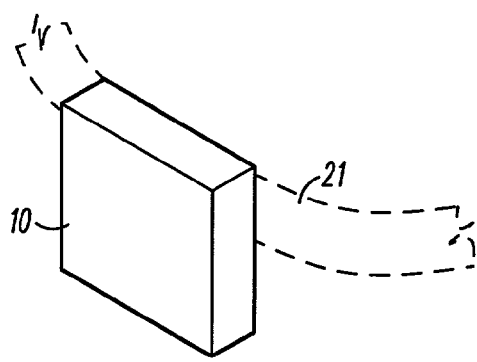
FIG. 2 comprises a detailed perspective view of the radio as worn in an exemplary fashion on a belt.

Such a radio 10 can and should ordinarily be formed within a relatively small form factor. For some applications (such as a transmit only device intended for hidden and/or discrete use) a very small form factor may be appropriate. For other applications, including a two-way device intended to interact in one or more significant ways with an individual wearing the device, a larger form factor may be appropriate and/or necessary. In one embodiment and as shown in FIG. 2, the radio 10 can clip to the belt 21 of a pedestrian (not shown) using a variety of known or hereafter developed belt clip techniques. In other embodiments, the radio could be carried by hand, worn on a necklace, placed in a pocket, or secured in a wide variety of other ways. For use with animals, the radio 10 could be placed on a collar (working dogs that accompany vision impaired individuals could alternatively have such a radio 10 attached to their harness or lead). With bicycles, skateboards, and the like, the radio 10 could either be attached to the riding individual or to the nonautomotive conveyance itself.

Figure 3:
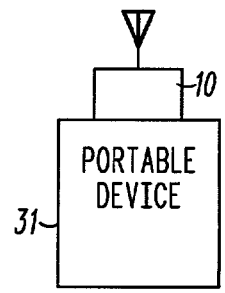
FIG. 3 comprises a block diagram depiction of a radio as coupled to a portable device in accordance with various embodiments of the invention.
Figure 4:
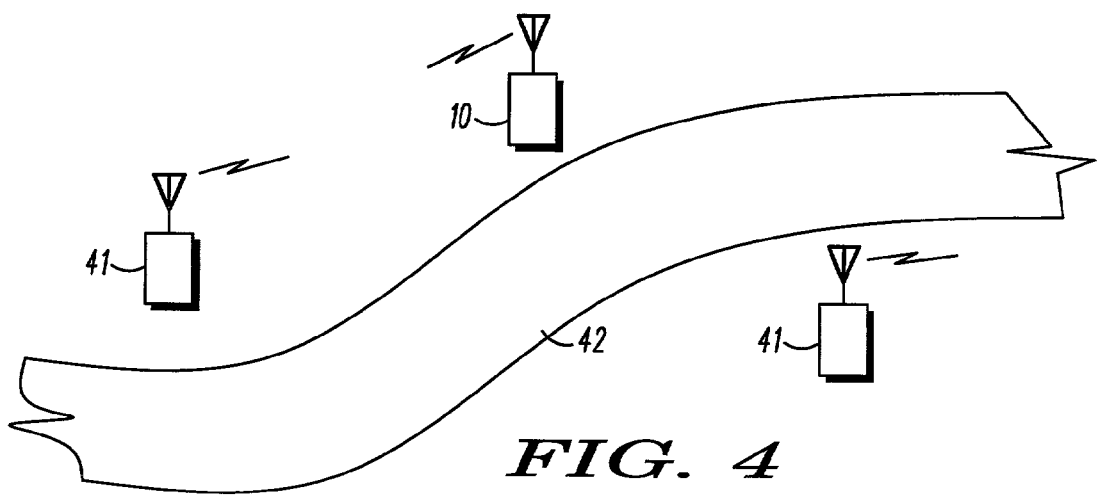
FIG. 4 comprises a top plan diagrammatic depiction of a radio configured in accordance with various embodiments of the invention and operating within a wireless communications system.

Many individuals already carry with them a portable electronic device such as a cellular telephone or other portable two-way communications device, a personal digital assistant, a portable computer, a global positioning system receiver and so forth. For at least some individuals, it may be desired to provide the radio 10 as a module that is constructed and arranged to physically and operably couple with the portable electronic device of choice. As depicted in FIG. 3, the radio 10 can mount on the exterior of the portable device 31 if desired. This arrangement may be particularly effective when the portable device 31 is itself relatively small, at least in comparison to the radio 10. In another embodiment, the radio 10 can be disposed within a recessed area of the portable device (for example, the radio 10 can be configured within the form factor of a PCM-CIA card that can be readily disposed within an accommodating port in, for example, a portable computer or some personal digital assistants. In these various embodiments, various levels of interoperability can be provided as appropriate to the application. In most such embodiments, the radio 10 will at least likely couple with the portable device 31 to the extent of drawing at least some operating power for the radio.

In another related embodiment, the radio 10 can comprise a module that physically and operably couples with a vehicle mounted housing. In this embodiment, when mounted within the vehicle housing the radio 10 can function as an ordinary receiving and transmission unit to facilitate communications with the roadside information service as regards operation of the vehicle. Upon removing the radio 10 from the vehicle housing, however, the radio 10 can begin operating in a mode consistent with the teachings set forth herein.

Various operating embodiments of the radio 10 will now be described.

With reference to FIG. 5, when operating in a beacon mode 50 the radio 10 can set 51 a timer or count to a predetermined value (denoted as "X" in FIG. 5) and then transmit 52 information regarding the nonautomotive roaming object with which the radio 10 is being used. The timer or count can then be incremented 53 and a determination 54 made as to whether the timer/count exceeds a predetermined value (denoted as "Y" in FIG. 5). When the count has not been exceeded the timer/count can again be incremented 53 until the count has been exceeded. When the count has been exceeded the process again provides for transmission 52 of object information. In this mode, the radio 10 automatically broadcasts object information from time to time for the benefit of other relatively nearby receiving units.

The information so transmitted can include a number of items. For example, the information can identify the corresponding nonautomotive roaming object itself. This identification can be specific (for example, a driver's license number for an individual carrying the radio 10 could be utilized or a serial number on a bicycle) or somewhat more general. For example, the information could identify or characterize the nonautomotive roaming object as belonging to a particular predefined category (categories can be utilized to distinguish between living and non-living objects, pedestrians and bicyclists, able-bodied person and persons with permanent or temporary disabilities, adults and children, joggers and hitchhikers, and so forth). The information could also include present location information regarding the object (again, location information can be absolute location information such as latitude and longitude data and/or relative location information such as present distance from an oncoming vehicle).

Such information is transmitted, as indicated earlier, compatibly with a dedicated short range radio frequency-based roadside information service. Such transmissions would therefore be readily received by a vehicle already equipped to interact with the roadside information service. Consequently, no additional hardware investments or installations would be required to allow vehicles to benefit from such transmissions. Instead, only supplemental programming would facilitate beneficial use of information received in such transmissions. For example, upon receiving such a beacon transmission from an individual jogging at night alongside a darkened road, the vehicle could ascertain from the information that a jogger is presently a predetermined distance ahead of the vehicle. Such information, particularly when combined with information regarding the present speed of the vehicle, can be utilized in various ways to benefit both parties. For example, an alert can be provided to the driver of the vehicle of the jogger's proximity. Countless other applications are of course possible. Animals of value or that present a hazard to vehicles could warn of their presence in this way. Information regarding a pedestrian's disabilities, which disabilities may not be obvious to a vehicle's driver, can be made available to the driver to thereby prompt greater or more informed care or behavior. Individuals requiring assistance can signal their location and their appropriate category regarding their status to thereby attract assistance in a relatively safe fashion. These and many other applications are all rendered possible by provision of this object-borne radio 10 when operating in this beacon mode 50.

Referring now to FIG. 6, a remote transmit mode 60 will be described. Upon receiving a signal 61 (which signal is again compatible with the dedicated short range roadside information service) a determination 62 is made as to whether the signal includes one or more types of control signals. If not, the process can conclude 64. If a control signal is present, however, the radio 10 can effect a resultant transmission 63. The nature of the transmission and/or the content of the transmission can be controlled in whole or in part by the control signal itself. For example, a vehicle equipped with a roadside information service radio can occasionally broadcast a message requesting radios that are associated with a nonautomatic roaming object to themselves broadcast a message indicating their presence and/or location. Upon receiving such a control signal, the radio 10 can transmit 63 a message that includes both the requested or appropriate information regarding the corresponding nonautomotive roaming object and location information as available. This information is then received by the vehicle and can be used accordingly.

As another example, the radio 10 can be worn by a child. If the child becomes separated from his or her guardian the guardian can effect transmission of a control signal instructing the radio 10 to switch to a high-power mode of transmission and broadcast an identifying message that includes a present location for the radio 10 and hence the child. This information can then be utilized to locate the child. Such a signal can be initiated in a variety of ways. Pursuant to one approach, the guardian or other available person can simply broadcast the signal using either a short range or high-power transmission mode. If the radio 10 is within reception range of this broadcast, the signal can be received and an appropriate response sent as described. Pursuant to another approach, the guardian or other available person can broadcast the signal along with a repeat control signal. When received by another compliant radio, the repeat control signal can be decoded and serve to effect a repeated broadcast of the original message. These repeated broadcasts can effectively increase the broadcast range and increase the likelihood of reaching the child's radio 10. By yet another approach, the guardian or other available person can contact the roadside information service infrastructure through some other means (such as by telephone, fax, or e-mail) to arrange for a systemwide transmission of the indicated signal.

If desired, and as described below, the radio 10 can retain in its memory 13 at least a partial history of locations and corresponding operational states. For example, if the user of the radio 10 disables the radio 10 from operating in the beacon mode 50 or from operating in the remote transmit mode 60, this operational status can be stored along with the locations the user traversed while maintaining such operational status (time of day or elapsed time are other metrics that one might select to maintain as relevant to this history). At some later time, the radio 10 can receive a signal that constitutes a request to send part or all of this maintained history (by one embodiment, this can occur after the remote transmit mode 60 has again been enabled, and by another embodiment, such a query can be treated as a high priority signal that the radio 10 must respond to regardless of an otherwise disabled status).

This activity history regarding, for example, disablement of the transmission mode could be utilized to dynamically adjust insurance coverage terms and conditions for the nonautomotive roaming object associated with the radio 10 (usage of the radio 10 in its beacon mode 50 and remote transmit mode 60 should ordinarily enhance the safety of the object and hence use or nonuse of these functions could be used to receive favorable or unfavorable insurance rates). In one embodiment, the radio 10 could receive a follow-on message containing information regarding such dynamic adjustment of insurance coverage terms and conditions. This information could be provided in whole or in part to a corresponding user to prompt or reward desired behaviors.

So configured, the radio 10 can automatically respond to instructions and inquiries with transmissions that optionally include information regarding the corresponding nonautomotive roaming object and/or a present location for the object.

Pursuant to one embodiment, the radio 10, upon receiving a signal 61, can determine 65 whether an imminent collision with an oncoming vehicle is likely. For example, if the received signal includes a specific message to this effect (as could be transmitted by a vehicle that has processed an earlier message as transmitted by the radio 10 that included the radio's present location as compared to the vehicle's present location, speed, and heading to itself conclude that the collision is likely) this message could be directly interpreted to determine 65 that a collision is imminent. Upon determining 65 that a collision is imminent, the radio 10 could transmit 63 a message containing specific items of information that may bring aid rapidly to the user and/or that will assist investigators who later try to determine what happened. For example, information such as present location, respective velocities and directional headings, identifying information from other objects and vehicles as recently received (which might be useful to aid in identifying potential witnesses if necessary), and the fact that a collision is likely may all be useful transmissions to effect. Such information could be transmitted prior to the calculated time of impact and/or could also be transmitted subsequent to the impact if the device survives the collision.

Referring now to FIG. 7, a remote disabled mode 70 will be described.

Upon receiving 71 a signal, the radio 10 determines 72 whether the signal includes an instruction to disable the radio's transmitter. If not, the process ends 74. If the signal does include a disable signal, however, the transmitter is disabled 73 automatically. This mode 70 can be useful in a variety of situations. For example, hospitals usually forbid use of wireless communications products on their premises in order to avoid potential interference with delicate medical instrumentation. By positioning a roadside information service kiosk that transmits a beacon signal that includes this disable signal, such radios 10 as may be carried on the premises will be automatically disabled. Similarly, other radio-free zones, such as airplanes, can be accommodated as well.

Figure 8:
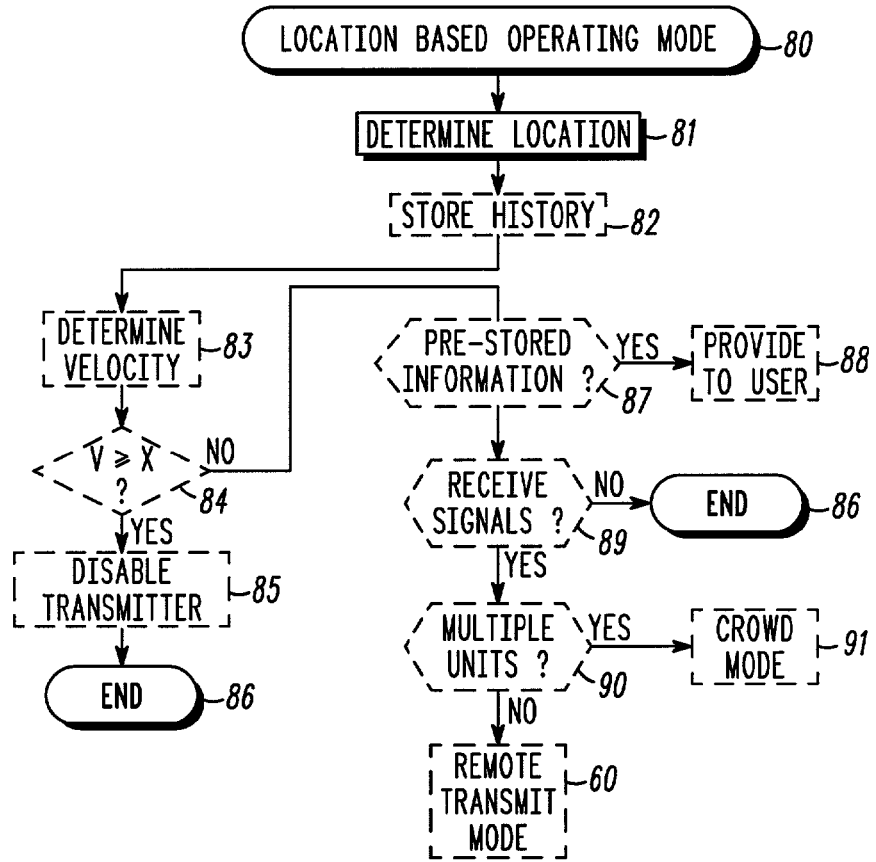
FIG. 8 comprises a flow diagram configured in accordance with various embodiments of the invention.

Location information has been shown above to be an important part of many messages. Additional use of location information will now be described with respect to a location based operating mode 80 and with reference to FIG. 8. As mentioned above, upon determining 81 at least an approximate present location of the radio 10, the radio 10 can optionally store various items of information in a history (including operational states, transmitted messages, received messages, and location information as corresponds to any of the above).

In one embodiment, the radio 10 can determine 83 a present velocity for the radio 10. This can be done, for example, by using present location and recent location information to determine at least an approximate present velocity of the nonautomotive roaming object. By determining 84 that the present velocity "V" equals or exceeds a predetermined threshold "X" the radio 10 can determine, for example, that the corresponding object is now likely in a vehicle and therefore disable 85 the radio's transmitter and conclude 86.

Pursuant to another embodiment, the radio 10 can determine 87 whether the present location corresponds to any previously stored information in the memory. Such information can then be provided 88 to the user. For example, if the user is standing at a particular intersection, and if the radio 10 has information (such as information regarding a restaurant) that corresponds to that location, such information can be provided to the user via the user interface 14. Pursuant to this embodiment, at least certain aspects of the user interface 14 are selectively controlled in response to location information.

Figure 9:
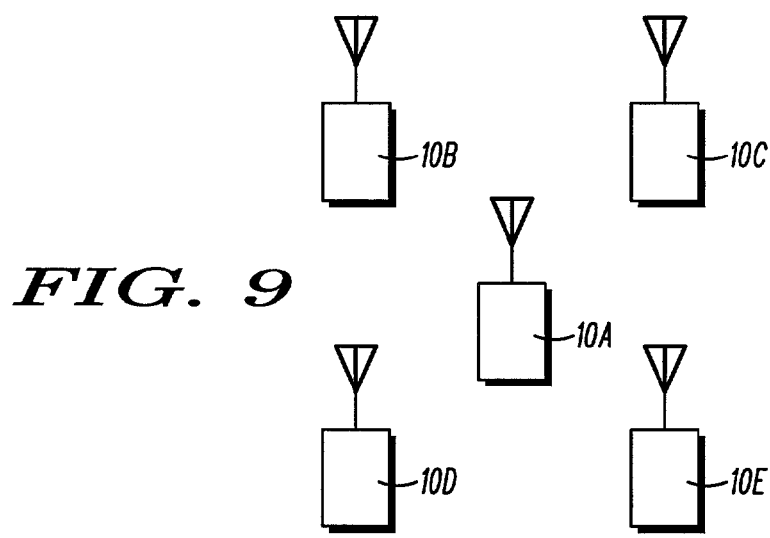
FIG. 9 comprises a diagrammatic depiction of a group of radios configured in accordance with various embodiments of the invention.

The radio 10 can continue to determine 89 whether a signal has been received. If not the process can end 86. If a signal has been received, in one embodiment, the radio 10 can determine 90 whether signals from multiple proximal and similar units are being received. For example, and with momentary reference to FIG. 9, a first radio 10A may detect, for example, beacon mode signals from four other proximal and similar units (10B through 10E). Upon detecting 90 such a circumstance, the radio 10 can enable a crowd mode 91. A number of appropriate actions can be implemented in this context. For example, the radio 10 can automatically reduce its own transmission power to thereby minimize interference. Or, the radio 10 can simply disable its own transmitter. As another approach, one of the radios can automatically begin transmitting information to represent the presence and location of the group while the other radios simultaneously either disable their transmitters or significantly reduce their transmitting power. The information transmitted can optionally include identifying information for various members of the group and/or at least some category information (for example, certain categories may always be identified while other categories may be optional). Pursuant to this embodiment, nearby vehicles can receive useful information regarding the cluster of nonautomotive roaming objects while interference between units is potentially minimized.

The basic radio platform described above in its various embodiments has been shown to readily support a wide variety of beneficial activities that enhance the safety and comfort of both vehicles and their occupants and pedestrians and their property. By working compatibly with dedicated short range roadside information services, established communications infrastructure is leveraged with minimal additional cost. Although various embodiments have been described, those skilled in the art will recognize that other modifications, alterations, and combinations are possible. Such modifications, alterations, and combinations should be viewed as being within the spirit and scope of the invention.

We claim:

1. A device adapted and configured to be disposed on a nonautomotive roaming object, comprising a radio that is compatible with a dedicated short range radio frequency-based roadside information service, wherein the radio comprises at least one of:
    a transmitter that transmits object information regarding the nonautomotive roaming object compatibly with the dedicated short range radio frequency-based roadside information service; and
    a receiver that receives information service information compatibly with the dedicated short range radio frequency-based roadside information service
    wherein the object information includes category information that identifies the nonautomotive roaming object as belonging to a particular predefined category that is one of a group of categories consisting of living objects, non-living objects, pedestrians, bicyclists, able-bodied persons, temporarily disabled persons, permanently disabled persons, adults, children, joggers, and hitchhikers or a group of categories consisting of a subset of the categories heretofore named.

2. A device adapted and configured to be disposed on a nonautomotive roaming object, comprising a radio that is compatible with a dedicated short range radio frequency-based roadside information service, wherein the radio comprises at least one of:
- a transmitter that transmits object information regarding the nonautomotive roaming object compatibly with the dedicated short range radio frequency-based roadside information service; and
- a receiver that receives information service information compatibly with the dedicated short range radio frequency-based roadside information service, wherein the transmitter comprises a dedicated short range transmitter that includes a high power mode of operation that is activated by receipt of a control signal by the receiver that commands the device to transmit, using the transmitter, a high power signal that identifies the nonautomotive roaming object.

3. A device according to claim 2, wherein the device is constructed and arranged to physically and operably couple with and draw at least some operating power from a portable device wherein the portable device comprises one oh portable two-way communications device, a personal digital assistant a portable computer, and a global positioning system receiver.

4. A device according to claim 2, wherein the device is constructed and arranged for installation in a vehicular electronic equipment, wherein the device is constructed and arranged to physically and operably couple with and draw at least some operating power from the vehicular electronic equipment.

5. The device according to claim 2,
wherein the high power signal includes a location of the device.

6. A device adapted and configured to be disposed an a nonautomotive roaming object, comprising a radio that is compatible with a dedicated short range radio frequency-based roadside information service, wherein the radio comprises at least one of:
- a transmitter that transmits object information regarding the nonautomotive roaming object compatibly with the dedicated short range radio frequency-based roadside information service; and
- a receiver that receives information service information compatibly with the dedicated short range radio frequency-based roadside information service, wherein the object information identifies a non-automotive roaming object of at least one of the following types-a person, an animal, a non-automotive vehicular object being used by a person, and an occasionally moving object wherein-the transmitter is disabled upon the receiver receiving a transmitter disable signal.

7. The device according to claim 6,
wherein the device is responsive to a signal received by the receiver that includes a repeat command to determine whether the device is a device identified by information within the signal, and when the device is not the identified device, to transmit information obtained from the received signal, including the repeat command and the device identification, by the transmitter of the device, and wherein the repeat command is also acted upon by the device as the transmitter disable signal after the information obtained within the received signal is transmitted.

8. A method for use with a device that is adapted and configured to be disposed on a nonautomotive roaming object, the device comprising a user interface and a radio that is compatible with a dedicated short range radio frequency-based roadside information service, wherein the radio comprises at least one of:
- a transmitter operably coupled to the user interface that transmits inform ation regarding the nonautomative roaming object compatibly with the dedicated short range radio frequency-based roadside information service; and
- a receiver operably coupled to the user interface that receives information service information compatibly with the dedicated short range radio frequency-based roadside information service;

the method comprising automatically using location information to selectively control at least one of the transmitter and the user interface
wherein transmitting a message further includes transmitting a message that indicates at least a likelihood that the device will imminently be involved in a collision with a vehicle.

9. A method for use with a device that is adapted and configured to be disposed on a nonautomotive roaming object, the device comprising a user interface and a radio that is compatible with a dedicated short range radio frequency-based roadside information service, wherein the radio comprises at least one of:
- a transmitter operably coupled to the user interface that transmits information regarding the nonautomotive roaming object compatibly with the dedicated short range radio frequency-based roadside information service; and
- a receiver operably coupled to the user interface that receives information service information compatibly with the dedicated short range radio frequency-based roadside information service;

the method comprising automatically using location information to selectively control at least one of the transmitter and the user interface
wherein automatically using location information to selectively control at least one of the transmitter and the user interface includes:
determining that the nonautomotive roaming object is presently located proximal to a plurality of other non-automotive roaming objects;
automatically initiating a predetermined action.

10. The method of claim 9
wherein automatically initiating a predetermined action includes automatically initiating a reduced transmission power mode of operation.

11. The method of claim 10 wherein automatically initiating a reduced transmission power mode of operation includes disabling the transmitter.

12. The method of claim 9 wherein automatically initiating a predetermined action includes automatically transmitting at least some information regarding the other nonautomotive roaming objects.

13. A method for use with a device that is adapted and configured to be disposed on a nonautomotive roaming object, the device comprising a user interface and a radio that is compatible with a dedicated short range radio frequency-based roadside information service, wherein the radio comprises at least one of:
- a transmitter operably coupled to the user interface that transmits information regarding the nonautomotive roaming object compatibly with the dedicated short range radio frequency-based roadside information service; and
- a receiver operably coupled to the user interface that receives information service information compatibly with the dedicated short range radio frequency-based roadside information service;

the method comprising automatically using location information to selectively control at least one of the transmitter and the user interface, and wherein the device further includes a memory and wherein the method further comprises storing at least some history regarding the nonautomotive roaming object in the memory, and wherein automatically using location information to selectively control at least one of the transmitter and the user interface includes:

storing at least some activity history regarding disablement of the transmitter in the memory;

transmitting at least some of the activity history, such that the activity history regarding disablement of the transmitter can be utilized to dynamically adjust insurance coverage terms and conditions.

14. The method of claim 13 and further including:

receiving information regarding dynamic adjustment of the insurance coverage terms and conditions compatibly with the dedicated short range radio frequency-based roadside information service.

15. A method for use with a device that is adapted and configured to be disposed on a nonautomotive roaming object, the device comprising a user interface and a radio that is compatible with a dedicated short range radio frequency-based roadside information service, wherein the radio comprises at least one of:

a transmitter operably coupled to the user interface that transmits information regarding the nonautomotive roaming object compatibly with the dedicated short range radio frequency-based roadside information service; and a receiver operably coupled to the user interface that receives information service information compatibly with the dedicated short range radio frequency-based roadside information service;

the method comprising automatically using location information to selectively control at least one of the transmitter and the user interface, wherein automatically using location information to selectively control at least one of the transmitter and the user interface includes:

using location Information to determine at least an approximate present velocity of the nonautomotive roaming object;

whenever the approximate present velocity at least exceeds a predetermined threshold, automatically disabling the transmitter.

16. A device adapted and configured to be disposed on a nonautomotive roaming object, comprising a radio that is compatible with a dedicated short range radio frequency-based roadside information service, wherein the radio comprises at least one of:

a transmitter that transmits information regarding the nonautomotive roaming object compatibly with the dedicated short range radio frequency-based roadside information service; and a receiver that receives information service information compatibly with the dedicated short range radio frequency-based roadside information service, wherein the device is responsive to a signal received by the receiver that includes a repeat command to determine whether the device is a device identified by Information associated with the repeat command, and when the device is not the identified device, to transmit information obtained from the received signal, including the repeat command and the device identification.

* * * * *